United States Patent
Lee et al.

(10) Patent No.: US 6,745,277 B1
(45) Date of Patent: Jun. 1, 2004

(54) INTELLIGENT INTERLEAVING SCHEME FOR MULTIBANK MEMORY

(75) Inventors: Eugene Lee, San Jose, CA (US); Somsubhra Sikdar, San Jose, CA (US)

(73) Assignee: Force10 Networks, Inc., Milpitas, CA (US)

( * ) Notice: Subject to any disclaimer, the term of this patent is extended or adjusted under 35 U.S.C. 154(b) by 391 days.

(21) Appl. No.: 09/679,266

(22) Filed: Oct. 4, 2000

(51) Int. Cl.[7] .............................................. G06F 12/00
(52) U.S. Cl. ........................ 711/5; 711/157; 711/158; 711/213; 711/147; 711/148; 365/230.03; 365/230.04; 370/394; 370/395.1; 370/395.6; 370/396; 370/400; 370/401; 709/102; 709/103
(58) Field of Search .......................... 711/5, 157, 158, 711/213; 370/394, 395.1, 396, 395.6, 400, 401, 412, 413; 709/102, 103; 365/230.03–230.04

(56) References Cited

U.S. PATENT DOCUMENTS

| | | | | |
|---|---|---|---|---|
| 5,287,477 A | * | 2/1994 | Johnson et al. | 711/157 |
| 5,313,603 A | * | 5/1994 | Takishima | 711/157 |
| 5,594,700 A | * | 1/1997 | Ward et al. | 365/230.03 |
| 5,701,434 A | * | 12/1997 | Nakagawa | 711/157 |
| 6,026,464 A | * | 2/2000 | Cohen | 711/5 |
| 6,125,422 A | * | 9/2000 | May | 711/5 |
| 6,490,248 B1 | * | 12/2002 | Shimojo | 370/229 |
| 6,493,347 B2 | * | 12/2002 | Sindhu et al. | 370/401 |
| 6,671,255 B1 | * | 12/2003 | Buhrgard et al. | 370/230 |

* cited by examiner

Primary Examiner—Matthew Kim
Assistant Examiner—Zhuo H. Li
(74) Attorney, Agent, or Firm—Marger Johnson & McCollom, PC (57) ABSTRACT

A network processing device intelligently interleaves packets for read and write access requests in a multibank memory. The system intelligently writes packets into the different memory banks so that the same memory bank is not used for back-to-back packet reads. The last memory bank write is determined for each output queue. This write information is used in combination with look ahead packet read information for a group of packets from the next output queue scheduled to read packets from memory. The scheduler uses all this information to avoid any back-to-back packet read, write, or read/write accesses to the same memory bank. This intelligent packet interleaving scheme preserves memory bus bandwidth normally wasted accessing the same memory banks.

21 Claims, 6 Drawing Sheets

INTELLIGENT INTERLEAVING SCHEME FOR MULTIBANK MEMORY

BACKGROUND OF THE INVENTION

This invention relates to a system for accessing memory and more particularly to intelligently interleaving accesses to a multibank memory.

Network processing devices, such as routers, switches, concentrators, gateways, etc., receive packets from multiple input ports. It is desirable to route these packets as quickly as possible to the correct destination address through corresponding output ports. Headers in the incoming packets are read to determine the correct output ports for the incoming packets. The incoming packets are temporarily stored in a memory buffer until the output ports assigned to the incoming packets are scheduled to forward the packets to the appropriate destination address.

The memory buffer must be large to handle the large number of packets received at the input ports and to temporarily store large bursts of packets that could be received on one or more of the input ports. Certain memory devices, such as Dynamic Random Access Memories (DRAMs), are more cost effective than Static Random Access Memory (SRAM) in large memory applications. However, several clock cycles are required for precharging the memory banks each time the DRAM is accessed. This DRAM activation time overhead does not pose a significant time cost when large packets are stored in memory. However, when small packets are stored in the DRAM, the access required to read or write each packet presents a substantial bottleneck in the overall rate that packets can be processed by the network processing device.

The present invention addresses this and other problems associated with the prior art.

SUMMARY OF THE INVENTION

A network processing device intelligently interleaves packets for read and write access requests in a multibank memory. The system intelligently writes packets into the different memory banks so that the same memory bank is not used for back-to-back packet reads. The last memory bank write is determined for each output queue in the network processing device. This last bank information is used in combination with look ahead packet read information for a group of packets from the next output queue scheduled to read packets from memory. The scheduler uses all this information to avoid any back-to-back packet read, write, or read/write accesses to the same memory bank. This intelligent packet interleaving scheme preserves memory bus bandwidth that would normally be wasted accessing the same memory banks.

The foregoing and other objects, features and advantages of the invention will become more readily apparent from the following detailed description of a preferred embodiment of the invention which proceeds with reference to the accompanying drawings.

DETAILED DESCRIPTION

Figure 1:
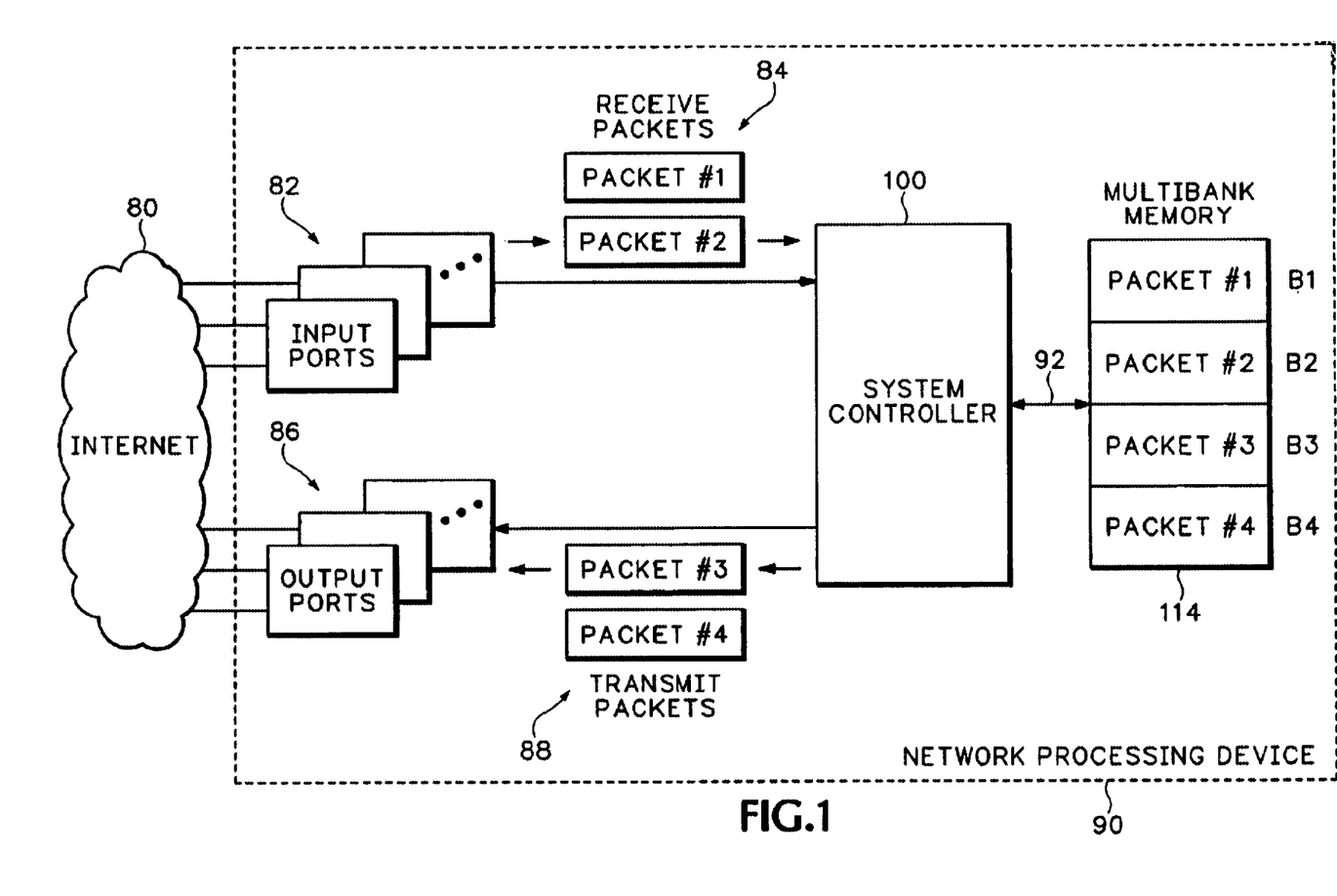
FIG. 1 is diagram of a network processing device that uses intelligent memory interleaving.

Referring to FIG. 1, a network processing device 90 is connected to an Internet network 80. The network processing device 90 includes input ports 82 that process incoming packets 84 from Internet 80. The incoming packets 84 include packet #1 and packet #2. A system controller 100 determines how the received packets 84 are routed back out through the appropriate output ports 86 to the Internet 80.

While waiting to be routed back out to the Internet 80, the receive packets 84 are temporarily stored in memory 114. Packet #3 and packet #4 have been previously stored in memory 114 and assigned to a particular output port 86. The system controller 100 reads the packets #3 and #4 (transmit packets 88) from memory 114 and sends the packets through the assigned output port 86 to the Internet 80.

The memory 114 in one embodiment is a Dynamic Random Access (DRAM) Memory that has multiple memory banks B1, B2, B3 and B4. The rate at which the network processing device 90 routes incoming packets from input ports 82 to output ports 86 depends on the bandwidth of memory 114. When small receive packets 84 are read from or written into the same memory banks, the overall packet processing rate of the network processing device 90 can be reduced. This is because the memory 114 requires a precharge access time of two or more clock cycles for each packet access to a memory bank. If multiple packets are read from the same memory bank back-to-back, that same memory bank cannot be precharged for the second memory access. This severely reduces memory bandwidth since no data can be transferred during this memory precharge period. Bandwidth is reduced even further when a packet read and a packet write occur back-to-back in the same memory bank.

The system controller 100 conducts an intelligent packet interleaving scheme with the received packets 84 written into memory 114 and the transmit packets 88 read out from memory 114. The packets are intelligently interleaved in the different memory banks B1–B4 so that packets are seldom read back-to-back from the same memory bank. The intelligent packet interleaving scheme also prevents back-to-back memory read/writes for the same memory banks.

In the example shown in FIG. 1, packet #1 and packet #2 are scheduled to be written into memory 114 during the same memory cycle that packet #3 and packet #4 are read from memory 114. A memory cycle is defined as a sequence of memory accesses used for reading a first group of packets from memory and writing a second group of packets to memory.

The last used memory banks for writing packets into memory for the same output ports assigned to packet #1 and Packet #2 are identified. The system controller 100 must select memory banks for writing packet #1 and packet #2 that are different than the last used memory bank for their assigned output ports. This prevents the two packets from being read from memory 114 back-to-back from the same memory bank. The last used memory bank for packet #1 is memory bank B3 and the last used memory bank for packet #2 is memory bank B4.

Before selecting two memory banks for writing packet #1 and packet #2, the system controller 100 also looks ahead to determine what memory banks are going to be accessed for reading packets out of memory 114 during the same memory cycle. In this case packet #3 will be read from memory bank B3 and packet #4 will be read from memory bank B4.

Since memory banks B3 and B4 are going to be accessed for packet read operations, the system controller 100 intelligently selects two other available memory banks, B1 and B2, for writing packet #1 and packet #2 into memory 114. Thus, all memory accesses during the next memory cycle are from different memory banks. Further, when packet #1 and packet #2 are eventually read from memory 114, neither will be read back-to-back with another packet in the same memory bank.

Figure 2:
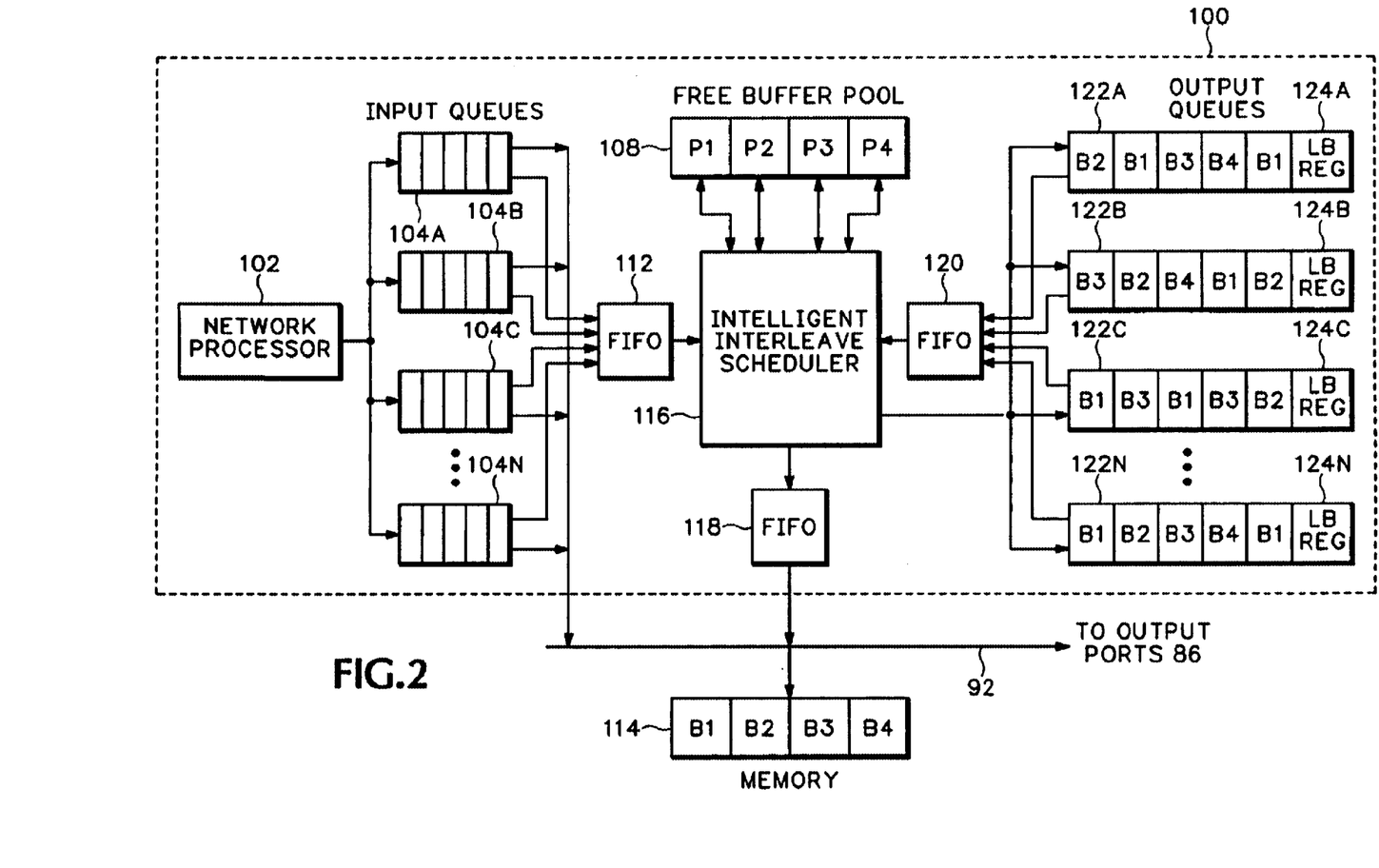
FIG. 2 is a detailed diagram of a system controller in the network processing device shown in FIG. 1.

FIG. 2 is a detailed diagram of the system controller 100 in FIG. 1. A network processor 102 receives packets through the different the input ports 82 connected to the Internet (see FIG. 1). The network processor 102 identifies which output queues 122A–122N are assigned to the individual received packets based on routing information in the packet headers. Each output queue 122A–122N is associated with one of the output ports 86 in FIG. 1. The network processor 102 adds any necessary destination address information to the packet headers and then sends the incoming packet to one of input queues 104A–104 N. Any number of input queues 104A–104N or output queues 122A–122N can be used. An arbitration scheme is used with the input queues 104A–104N to determine what order the received packets are loaded into a First In-First Out (FIFO) buffer 112.

An intelligent interleave scheduler (scheduler) 116 takes a group of packets from FIFO 112 and identifies the associated output queues 122A–122N. An intelligent interleaving scheme is then used by the scheduler 116 to determine which memory banks B1–B4 are used for writing the received packets into memory 114.

Address pointers P1–P4 in a free buffer pool 108 identify the next available address in each of memory banks B1–B4, respectively. The scheduler 116 writes the receive packets in FIFO 118 into the memory locations identified by the associated address pointers P1–P4 for the selected memory bank. The address pointer P1–P4 used for writing the packet is then stored in the output queue 122A–122N assigned to that packet.

The memory pointers in one of the output queues 122A–122N are selected for loading into FIFO 120. The scheduler 116 reads the packets identified by the pointers in FIFO 120 (transmit packets) according to the intelligent interleaving scheme and outputs the packets to the assigned output ports 86 (FIG. 1).

Incoming packets are received in random sizes ranging from 64 bytes to 1500 bytes in length. In the example shown in FIG. 2, the memory 114 has four memory banks. In one example, the memory 114 has a 256 bit data bus 92 and reads or writes from one memory bank B1–B4 at a time. Intelligent interleaving as described below can be applied to any number of memory banks and different memory configurations.

With a 256 bit memory bus, a Double Data Rate Dynamic Random Access Memory (DDR DRAM) can write one 64 byte packet in a single clock cycle. One half of the packet can be written in the first half of the clock cycle and the second half of the packet can be written in the second half of the clock cycle. The intelligent interleave scheduler 116 increases the overall rate that packets can be read or written from the memory 114.

Intelligent Packet Interleaving

The scheduler 116 prevents the same output queue 122A–122N from having to read two packets back-to-back from the same memory bank. This allows precharging of one memory bank while a packet is being read or written from another memory bank. This prevents DRAM precharge latency from effecting the bandwidth of memory bus 92.

Last Bank (LB) registers 124A–124N track the memory banks B1–B4 last used for storing packets assigned to output queues 122A–122N. The next packet assigned to a particular output queue 122A–122N is written into any memory bank other than the last memory bank identified in the associated LB register 124. The LB register 124 is then updated with the memory bank used for storing the latest received packet. This guarantees that the output queues 122A–122N will never read two packets back-to-back from the same memory bank.

Figure 3:
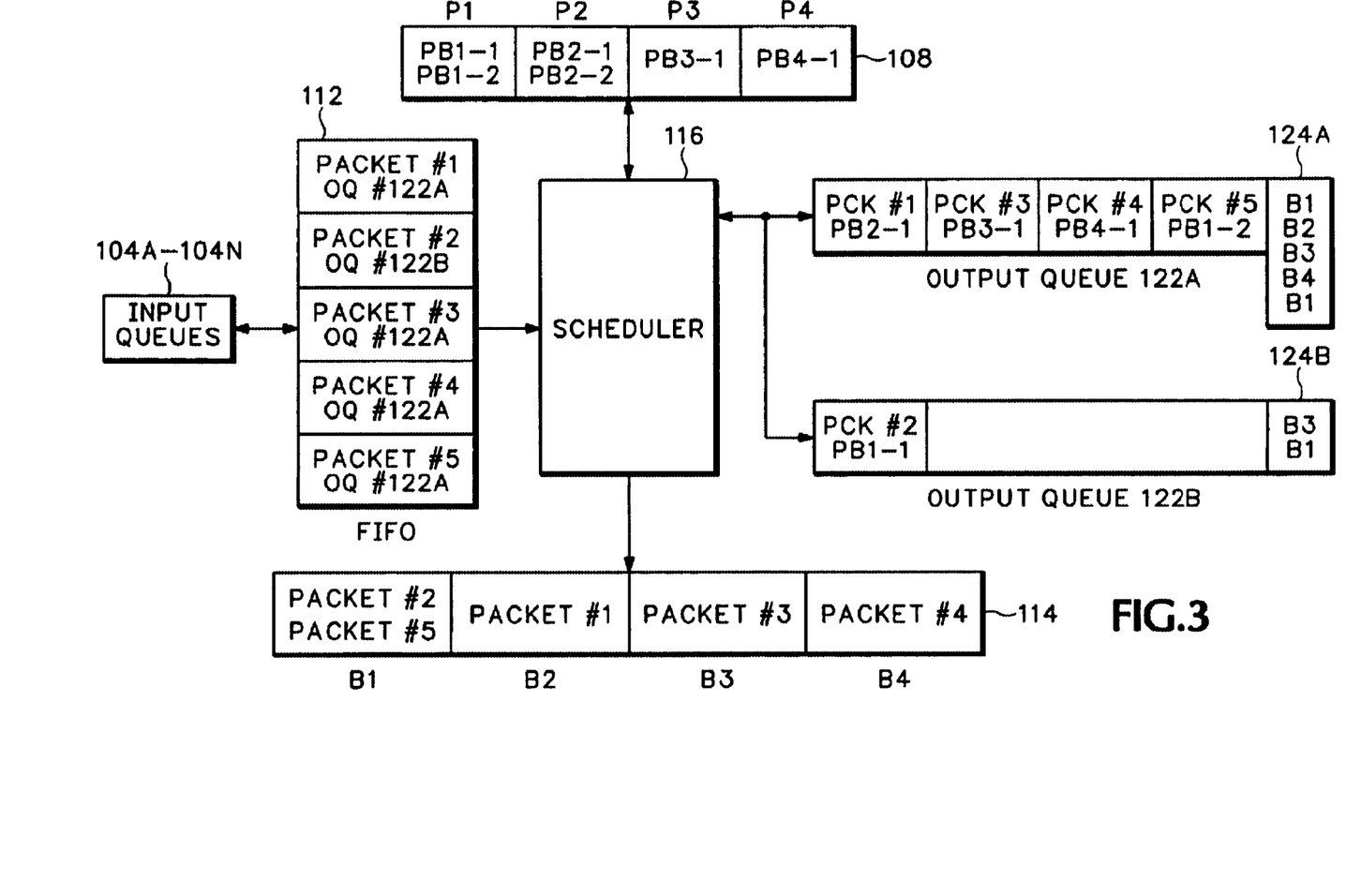
FIG. 3 is a diagram showing one example of how packets are intelligently interleaved by a scheduler in the system controller shown in FIG. 2.

FIG. 3 explains in further detail how the intelligent interleave scheduler 116 operates. Five receive packets are ready for writing into memory 114. Receive packets #1 and #3–#5 are assigned to output queue (OQ) 122A. Packet #2 is assigned to output queue 122B. The scheduler 116 reads the information in FIFO 112 identifying packet #1 as being assigned to output queue 122A. Scheduler 116 reads LB register 124A for output queue 122A to identify the memory bank last used for writing a packet assigned to output queue 122A. In this case, the last packet stored for output queue 122A was in memory bank B1.

The scheduler 116 selects any memory bank other than memory bank B1. One of the pointers PB2-1, PB3-1 or PB4-1 in free buffer pool 108 for one of banks B2, B3, or B4, respectively, are used for storing packet #1. In this case, scheduler 116 stores packet #1 at the next available address location in memory bank B2 (PB2-1). The memory address PB2-1 for packet #1 is loaded into output queue 122A. The next available memory address in memory bank B2 is then stored as pointer PB2-2 in free buffer pool 108.

Packet #2 is the next packet to be written into memory 114 by scheduler 116. Packet #2 is assigned to output queue 122B. The LB register 124B indicates that the last packet written into memory for output queue 122B was stored into memory bank B3. The scheduler 116 selects one of the memory banks other than memory B3 for storing packet #2. In this case, scheduler 116 selects memory bank B1. Packet #2 is stored in the next available memory location PB1-1 in memory bank B1. The address pointer PB1-1 is then loaded into output queue 122B.

The scheduler 116 reads the information for the next packet #3 from FIFO 112. Packet #3 is assigned to output queue #122A. Scheduler 116 sees that the last packet stored in memory for output queue #122A (packet #1) was stored in memory bank B2. Accordingly, scheduler 116 stores packet #3 in any memory bank other than memory bank B2. Scheduler 116 selects memory bank B3 for storing packet #3. In a similar manner, scheduler 116 stores packet #4 in memory bank B4 and stores packet #5 in memory bank B1.

The output queues are used as linked lists for reading packets from memory 114 to associated output ports 86 (FIG. 1). Output queue 122A is scheduled for reading packets to its associated output port. The four pointer addresses PB2-1, PB3-1, PB4-1 and PB1-2 are used for reading packets #1, #3, #4, and #5 from memory. Because the packets were intelligently interleaved by scheduler 116, no two packets will be read back-to-back from the same memory bank.

Intelligent Packet Read/Write Interleaving

The scheduler 116 also looks ahead a predetermined number of packet reads to determine the most efficient pattern for interleaving packet writes with packet reads. Several different factors are used to determine how packets are read and written to memory. Incoming packets assigned to the same output queue are never written back-to-back into the same memory bank. Each memory bank should be used for one memory read and one memory write during each memory cycle. Back-to-back read/write accesses to the same memory bank should be avoided. The number of consecutive reads and consecutive writes to different memory banks should be maximized. Finally, any packet read and packet write for the same memory bank in the same memory cycle should be spaced apart as many clock cycles as possible.

Figure 4:
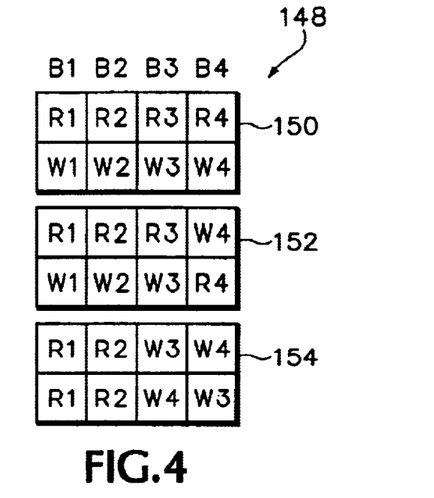
FIG. 4 is a diagram showing intelligently interleaved read and write patterns for the same memory cycle.

A memory cycle as described here includes four packet reads and four packet writes. However, any number or combination of packet reads and packet writes can be defined as one memory cycle. FIG. 4 shows different memory cycle read/write patterns 148. A first memory cycle pattern 150 includes four consecutive packet reads R1, R2, R3, and R4 from memory banks B1, B2, B3 and B4, respectively. The final half of the memory cycle pattern 150 includes four consecutive memory writes W1, W2, W3, and W4 to memory banks B1, B2, B3 and B4, respectively. The order of memory reads and memory writes are from left to right starting from the first memory read R1 from memory bank B1 and ending with the memory write W4 to memory bank B4.

There is only one packet read and packet write for each memory bank in pattern 150. Each read/write access to the same memory bank is spaced out as far as possible in the memory cycle. There are also no back-to-back memory reads, back-to-back memory writes or back-to-back memory read/write to the same memory bank.

Memory cycle pattern 152 shows three consecutive memory reads R1, R2, R3 from banks B1, B2, and B3, respectively, followed by four consecutive memory writes W4, W1, W2, and W3 to banks B4, B1, B2 and B3, respectively. A final memory read R4 is made from memory bank B4. Memory cycle pattern 154 shows yet another pattern for reading and writing packets. The three memory cycle patterns shown in FIG. 4 are selected examples. Any variety of memory cycle patterns can be used for efficiently writing and reading packets into memory.

Figure 5:
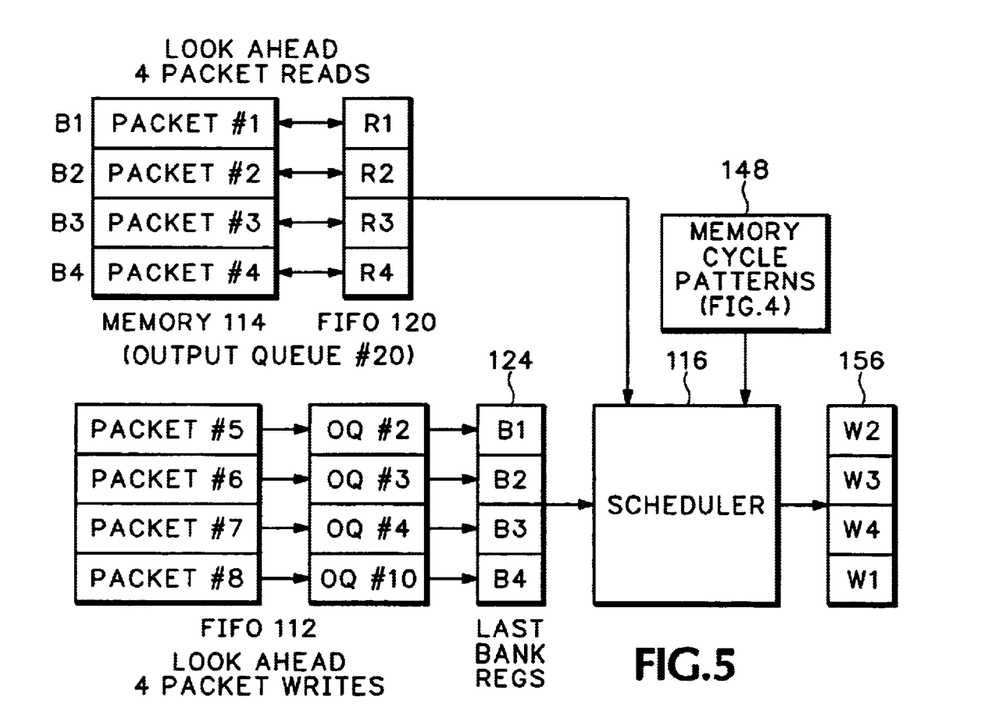
FIG. 5 shows one example of how the scheduler intelligently interleaves packet reads with packet writes.

FIG. 5 is a diagram showing the look ahead read feature of the scheduler 116. The scheduler 116 looks ahead at some number of packet reads for the next output queue in FIFO 120 scheduled for reading packets from memory 114. In the example shown in FIG. 5, output queue #20 is the next output queue scheduled for reading packets from memory 114. The next four pointers R1, R2, R3 and R4 from FIFO 120 point to addresses for packet #1 in memory bank B1, packet #2 in memory bank B2, packet #3 in memory bank B3, and packet #4 in memory bank B4, respectively.

The next four received packets in FIFO 112 scheduled for writing into memory 114 are packet #5 assigned to output queue #2, packet #6 assigned to output queue #3, packet #7 assigned to output queue #4, and packet #8 assigned to output queue #10. The last packets written into memory for output queues #2, #3, #4, and #10 are tracked in last bank registers 124 and are memory banks B1, B2, B3, and B4, respectively.

The scheduler 116 uses the look ahead packet read information in FIFO 120, the packet write information in FIFO 112, the last memory bank write information from the last bank registers 124 to determine what order to read and write packets to memory 114.

Write pattern 156 shows the order selected by scheduler 116 for writing packets #5–#8 into the memory banks. Referring to FIGS. 4 and 5, it can be seen that the memory bank read pattern R1–R4 in pattern 150 (FIG. 4) is the same as the look ahead packet reads in FIFO 120 (FIG. 5). Since all four memory banks B1–B4 are used for reading packets in the next memory cycle, the next four packet writes should, if possible, also use all four memory banks. This ensures even utilization of the memory banks while preventing any back-to-back memory bank accesses.

The scheduler 116 must also prevent writing any of the packets #5–#8 into the same memory bank used for storing the previous packet for that same assigned output queue. Looking at the last bank registers 124, it is seen that packet #5 is assigned to output queue #2 and the last packet assigned to output queue #2 was written into memory bank B1. The scheduler 116 assigns the buffer pool pointer for memory bank B2 to packet #5. This is represented by packet write W2 in pattern 156.

Packet #6 is assigned to output queue #3 and the last packet assigned to output queue #3 was written into memory bank B2. Accordingly, scheduler 116 assigns packet #6 to memory bank B3. This is represented by packet write W3 in pattern 156. In a similar manner, packet #7 is assigned to memory bank B4 (W4) and packet #8 is assigned to memory bank B1 (W1).

Figure 6:
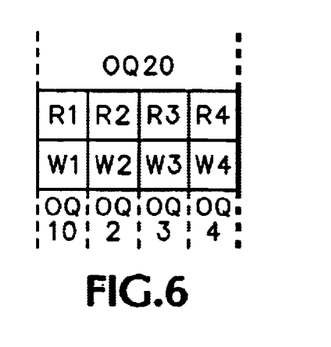
FIG. 6 shows the final packet read and packet write pattern generated in FIG. 5.

FIG. 6 summaries the sequence of interleaved packet reads R1–R4 and packet writes W1–W4 for the next memory cycle in FIG. 5. The scheduler first initiates the four consecutive reads R1, R2, R3 and R4 of packets #1–#4 from memory banks B1, B2, B3 and B4, respectively. The scheduler then initiates the four consecutive memory writes W1, W2, W3, and W4 of packets #5–#8 assigned to output queues #10, #2, #3, and #4, respectively.

Figure 7:
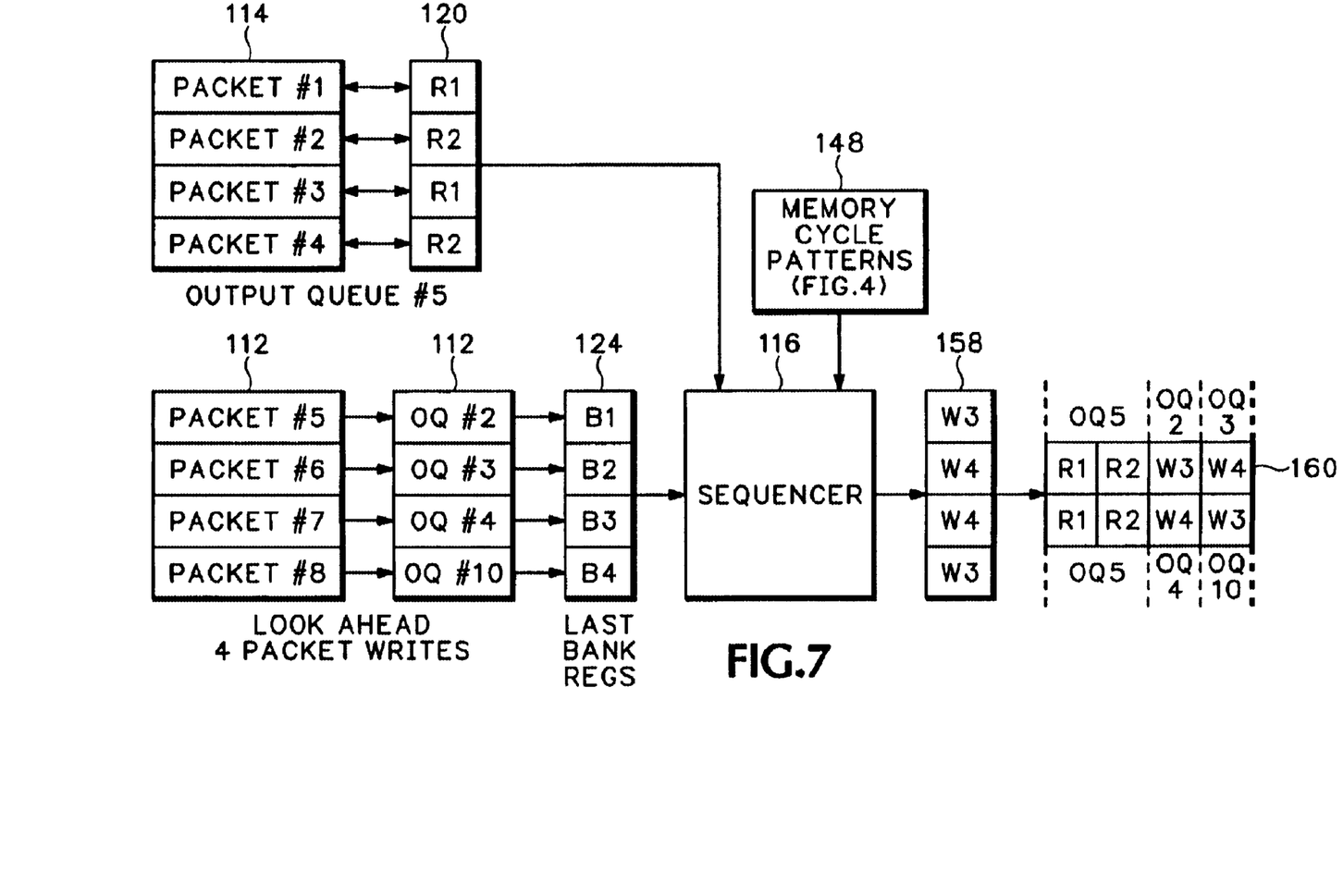
FIG. 7 shows another example of how packet reads are intelligently interleaved with packet writes.

FIG. 7 shows another example of the look ahead scheme where the next four memory bank reads from FIFO 120 are scheduled from output queue #5. Four receive packets #5–#8 are scheduled for writing into memory in the next memory cycle and are assigned to output queues #2, #3, #4, and #10, respectively. Last bank registers 124 show that the last packets written into memory for output queues #2, #3, #4, and #10 were for memory banks B1, B2, B3, and B4, respectively.

The next four memory bank reads for output queue #5 are from memory banks B1, B2, B1 and B2. The memory bank reads R1, R2, R1, R2 do not match memory cycle pattern 150 in FIG. 4. However, the read pattern for output queue #5 can be matched with memory cycle pattern 154 in FIG. 4. Since the four packet reads for output queue #5 only use memory banks B1 and B2, the scheduler 116 breaks up the four memory reads into two pairs. The first two memory reads R1 and R2 are interleaved with two packet writes into memory banks B3 and B4 for packets #5 and #6.

Packet #5 is assigned to output queue #2. The last packet written into memory for output queue #2 was memory bank B1. Packet #6 is assigned to output queue #3 and memory bank B2 was last used for writing a packet for output queue #3. Packet #5 can therefore be written into any memory bank except memory bank B1 and packet #6 can be written into any memory bank except memory bank B2. Since packets #1 and #2 will be read from memory banks B1 and B2, packet #5 written into memory bank #3 (W3) and packet #6 is written into memory bank #4 (W4). This is represented by the first two entries in pattern 158 in FIG. 7.

The scheduler 116 takes the final two packet reads R1 and R2 for packets #3 and #4 and combines them with the next two packet writes for packets #7 and #8. According to last bank registers 124, packet #7 cannot be written into memory bank B3 and packet #8 cannot be written into memory bank B4. Since packet #3 needs to be read from memory bank B1 and packet #4 needs to be read from memory bank B2, packet #7 is written into memory bank B4 (W4) and packet #8 is written into memory bank B3 (W3). This is shown in the bottom half of pattern 158. The read and write sequence used in the next memory cycle for reading packets #1–#4 from memory and writing packets #5–#8 into memory 114 is shown in memory cycle pattern 160.

Figure 8:
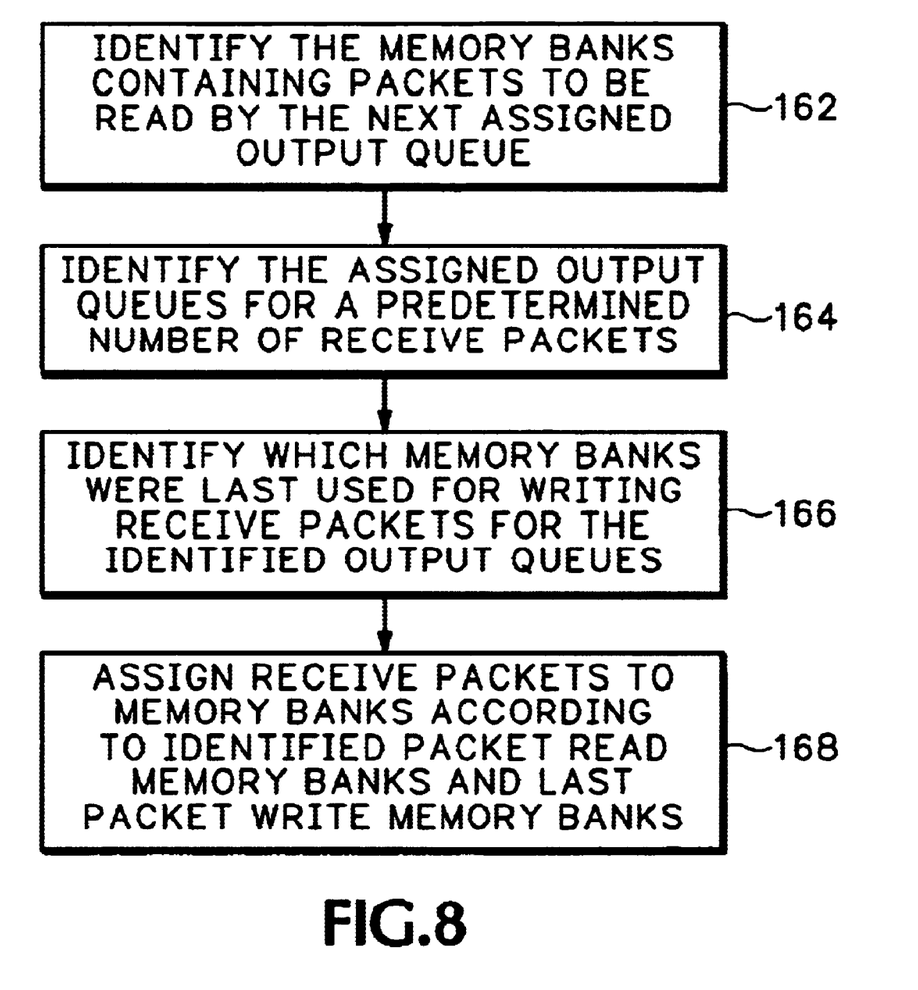
FIG. 8 is a flow diagram summarizing how packet writes for incoming packets are intelligently interleaved with packet reads for outgoing packets.

FIG. 8 is a flow diagram summarizing the intelligent interleaving scheme. In block 162 the scheduler identifies the memory banks containing packets for the next scheduled output queue. The scheduler in block 164 identifies the assigned output queues for a predetermined number of packets received from the Internet. The last memory banks used for writing packets into memory for the identified output queues are identified in block 166.

The scheduler in block 168 assigns the incoming packets to memory banks according to the memory banks used for reading packets in the next memory cycle and the last memory banks used for writing packets for the identified output queues of the incoming packets. As described above, the scheduler tries to use all available memory banks for either a packet read or packet write during the same memory cycle. The selected read/write pattern tries to conduct the largest number of consecutive reads and writes from different memory banks. The scheduler also prevents back-to-back read and writes to the same memory bank and tries to space read and writes to the same memory bank as many clocks cycles away from each other as possible during the same memory cycle.

It should be understood that different read and writes patterns can be used. The description above simply shows selected examples. The scheduler can also look ahead more or less than four output queue reads to determine the most efficient memory access for each memory cycle. Blocks are used to describe the different operations of the intelligent memory interleaving scheme. However, these operations may be implemented differently and in different combinations of hardware and/or software.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for interleaving packets in a memory having multiple memory banks, comprising:

identifying output queues assigned to packets received over a network, the output queues associated with output ports used for outputting the packets back over the network and the packets for any of the output ports stored in any of multiple memory banks;

identifying multiple reads and multiple writes for a same memory cycle, the memory cycle including multiple clock cycles for conducting the multiple reads and multiple writes;

identifying multiple reads that need to be read from the same memory banks during the memory cycle;

sequencing the clock cycles for the identified multiple reads as far apart as possible from each other during the memory cycle;

identifying the output queues associated with the multiple writes for the memory cycle;

selecting the memory banks for the multiple writes to be different than the memory banks previously used for storing received packets directed to the same output queues thereby causing back-to-back reads for the same output queues to be read from different memory banks;

identifying any of the multiple writes and multiple reads for the memory cycle that need to access the same memory banks;

sequencing clock cycles for the identified writes and reads as far apart as possible during the memory cycle; and accessing the memory banks during the memory cycle in sequence according to the clock cycle sequencing so that the memory banks can be precharged during the memory cycle while other memory banks are being accessed during the memory cycle.

2. A method according to claim 1 including:

identifying the memory banks not used for reads during in the memory cycle; and using the identified memory banks for writes during the memory cycle while also inserting accesses to other memory banks between writes or reads to the same memory banks.

3. A method according to claim 2 including interleaving the sequential reads and writes during the memory cycle so that any read or write to the same memory banks are spaced apart by at least one read or write to a different memory bank.

4. A method according to claim 2 including:

selecting a first set of the memory banks for writing the received packets into memory during a memory cycle, the first set excluding the last used memory banks for the output queues assigned to the received packets;

selecting a second set of memory banks from the first set for writing packets into memory, the second set excluding memory banks used for reading more than one packet during the memory cycle; and writing the received packets into the second set of memory banks.

5. A method according to claim 1 including conducting the multiple reads and multiple writes for the the memory cycle one at a time in the selected sequence to prevent reading and writing packets in back-to-back clock cycles from the same memory bank during the same memory cycle.

6. A method according to claim 1 including selecting the memory banks for writing the packets so a maximum number of different memory banks are accessed during the memory cycle.

7. A method according to claim 1 including arranging an order of sequencial packet accesses to the memory banks so that a packet read and packet write for the same memory bank are spaced as many clocks cycles as possible away from each other during the memory cycle.

8. A method according to claim 1 including:

providing multiple read/write sequence patterns for an equal number of reads and writes of the memory banks during the memory cycle wherein the read/write sequence patterns space clock cycles for the multiple reads and multiple writes for the same memory banks as far apart as possible during the memory cycle; and selecting one of the read/write sequence patterns according to the memory banks to be read during the memory cycle.

9. A method according to claim 1 including receiving the packets from different input ports in a network processing device and transmitting the packets from different output ports in the network processing device.

10. A network processing device, comprising:

input ports configured to receive packets;

output ports configured to transmit packets;

a memory having multiple memory banks accessible by any of the input ports and any of the output ports;

a system controller configured to write multiple receive packets into memory and read multiple transmit packets out of memory in sequence during multiple clock periods of a memory cycle, the system controller looking ahead to determine which memory banks are going to be used during the memory cycle to read transmit packets and then separating any sequential reads from the same memory banks with writes to other memory banks so that the same memory banks can be precharged during the accesses to the other memory banks; and the system controller then selecting from the other memory banks for writing the multiple receive packets so that the receive packets are written into memory banks different from the memory banks lasted used for storing receive packets directed to similar output queues.

11. A network processing device according to claim 10 wherein the system controller separates multiple sequential writes to the same selected memory banks with accesses to other memory banks so that writes to the same memory banks are not conducted in sequential back-to-back clock cycles during the same memory cycle.

12. A network processing device according to claim 10 wherein the system controller includes a scheduler that selects the memory banks for writing the received packets.

13. A network processing device according to claim 12 wherein the output queues contain memory pointers identifying a group of packets in memory for transmitting out to associated output ports.

14. A network processing device according to claim 13 including last packet registers configured to identify the last memory banks used for storing packets for each of the output queues.

15. A network processing device according to claim 14 including input queues containing information identifying the output queues assigned to the received packets.

16. A network processing device according to claim 15 wherein the input queues and the output queues both use priority schemes for gaining access to the scheduler.

17. A network processing device according to claim 10 including a free packet queue pool that identifies the available memory locations for writing packets to each one of the memory banks.

18. A network processing device according to claim 10 wherein the system controller:

selects a first set of the memory banks for writing the received packets, the first set excluding the last memory banks used for storing packets in the received packets assigned output ports;

selects a second set of memory banks from the first set according to a set of scheduled packet reads in a same memory cycle, the second set selected to minimize a number of back-to-back packet read and writes for the same memory bank during the same memory cycle; and writes received packets into the second set of memory banks.

19. A network processing device according to claim 18 wherein the system controller arranges an order of the scheduled packet reads, and the second subset of memory bank packet writes to maximize a number of consecutive packet reads from different memory banks and to maximize a number of consecutive packet writes to different memory banks during the same memory cycle.

20. A network processing device according to claim 19 wherein the system controller arranges the order of the scheduled packet reads and the second set of memory bank packet writes so that only packet read and packet write for the same memory bank are spaced as far away as possible during the same memory cycle.

21. A network processing device according to claim 10 wherein the memory comprises a DRAM Dynamic Random Access Memory (DRAM).

* * * * *

UNITED STATES PATENT AND TRADEMARK OFFICE
CERTIFICATE OF CORRECTION

PATENT NO.    : 6,745,277 B1
DATED         : June 1, 2004
INVENTOR(S)   : Lee et al.

It is certified that error appears in the above-identified patent and that said Letters Patent is hereby corrected as shown below:

Column 3,
Line 46, "FIFO 118 into" should read -- FIFO 112 into --.

Column 10,
Line 39, "comprises a DRAM Dynamic" should read -- comprises Dynamic --.

Signed and Sealed this

Twenty-eighth Day of December, 2004

JON W. DUDAS
*Director of the United States Patent and Trademark Office*